(12) United States Patent
Fujita

(10) Patent No.: US 6,571,858 B2
(45) Date of Patent: Jun. 3, 2003

(54) METHOD OF MANUFACTURING PREFORM FOR COMPOUNDING USE

(75) Inventor: Makoto Fujita, Anjo (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 09/956,555

(22) Filed: Sep. 20, 2001

(65) Prior Publication Data

US 2002/0117286 A1 Aug. 29, 2002

(30) Foreign Application Priority Data

Sep. 21, 2000 (JP) ........................... 2000-287375

(51) Int. Cl.$^7$ ............................................. B22D 19/02
(52) U.S. Cl. .................... 164/98; 164/97; 264/612; 264/640; 264/681; 264/682
(58) Field of Search ................ 164/97, 98; 264/612, 264/640, 681, 682

(56) References Cited

U.S. PATENT DOCUMENTS

| 4,544,610 A | * | 10/1985 | Okamoto et al. | ............ 267/149 |
| 4,818,633 A | * | 4/1989 | Dinwoodie et al. | ............ 164/97 |
| 5,942,205 A | * | 8/1999 | Murata et al. | ............... 423/598 |

FOREIGN PATENT DOCUMENTS

| EP | 0 624 657 | | 11/1994 |
| EP | 0 624 657 B1 | | 11/1994 |
| EP | 0 992 307 | | 4/2000 |
| JP | 1-147030 | * | 6/1989 |
| JP | 6-182524 | | 7/1994 |
| JP | 7-108370 | | 4/1995 |

* cited by examiner

Primary Examiner—Kuang Y. Lin
(74) Attorney, Agent, or Firm—Nixon Peabody LLP; Donald R. Studebaker

(57) ABSTRACT

A method of manufacturing a preform for compounding use which, is to be impregnated with a molten metal to be compounded with a matrix material, is provided. The method includes the step of mixing short fibers, ceramic particles and a binder material together to make a mixture. The average of lengths of the short fibers is 100 to 200 μm while the volumetric percentage of the short fibers is 1 to 7%. The content of the binder material in the mixture is 0.3 to 5.0 mass %. The method includes also the steps of forming the mixture so as to have a predetermined shape, and sintering the mixture at a temperature of 1000 to 1150° C. to form the preform. Thus, it is restrained that the preform is deformed or an un-reinforced region is formed in the compounded portion.

7 Claims, 10 Drawing Sheets

Forging Cast Process

METHOD OF MANUFACTURING PREFORM FOR COMPOUNDING USE

This application is based on the application No. 2000-287375 filed in Japan, the contents of which are hereby incorporated by reference.

BACKGROUND OF THE INVENTION

1. Field of the Invention

The present invention relates to a method of manufacturing a preform for compounding use, which is used, for example, in a casting process for making a brake disk rotor.

2. Description of the Prior Art

When a brake disk, which is one of parts constituting an automobile, is produced using an aluminum alloy by means of a casting process, the heat resistivity or wear resistance (i.e. anti-wear performance) of a sliding surface of the brake disk is reinforced by the following process. That is, at first, a preform such as a porous ceramic body or the like is disposed in a casting die. Then the preform is impregnated with a molten metal to be compounded with a matrix material.

As a conventional example of the above-mentioned type of preform, Japanese Laid-open Patent Publication No. 7-108370 discloses a preform, which is produced by means of the following process. That is, at first, titania ($TiO_2$) and alumina ($Al_2O_3$) in the form of inorganic fibers are mixed with a solvent Then the mixture, in which titania and alumina are non-uniformly dispersed, is dried up and formed into a predetermined shape to obtain the preform.

Meanwhile, Japanese Laid-open Patent Publication No. 6-182524 discloses another preform, which is produced by means of the following process using aluminum borate whiskers ($9Al_2O_3 \cdot 2B_2O_3$). That is, at first, sodium silicate and silicon carbide are added to the aluminum borate whiskers. Then the mixture is compacted to obtain the preform.

In addition, Japanese Laid-open Patent Publication No. 6-322459 (corresponding to European Patent Specification EP 0 624 657 B1) discloses a further preform, which is formed by mixing short fibers composed of alumina and silica with non-spherical mullite particles composed of alumina and silica.

Upon this, for example, the preform is formed by means of the following process. That is, SiC, $TiO_2$ and $CaCO_3$ of particle states, and aluminum borate whiskers and alumina short fibers for forming a skeleton of the preform are mixed with a solvent uniformly. Following that, alumina sol as a binder is added to the mixture. Then the mixture is sucked and dehydrated using a vacuum pump, and further dried up and sintered. The alumina short fibers form a main portion of the skeleton. Hereupon, if the lengths of the alumina short fibers are smaller, there may be such a tendency that the time required for sucking the mixture extremely increases while the amount of deformation of the preform after the sintering process may increases. On the contrary, if the lengths of the alumina short fibers are longer, each of the components in the mixture is non-uniformly dispersed so that larger non-reinforced regions may be formed in the compounded portion.

SUMMARY OF THE INVENTION

The present invention, which has been developed to solve the above-mentioned problems, has an object to provide a method of manufacturing a preform for compounding use, which can restrain deformation of the preform and formation of larger non-reinforced regions in a compounded portion.

According to the present invention, which has been developed to solve the above-mentioned problems and to achieve the above-mentioned object, there is provided a method of manufacturing a preform for compounding use which is to be impregnated with a molten metal to be compounded with a matrix material. The method includes the step of mixing short fibers, ceramic particles and a binder material together to make a mixture. The average of the lengths of the short fibers is 100 to 200 $\mu$m. The volumetric percentage (i.e. volumetric rate) of the short fibers is 1 to 7%. The content of the binder material in the mixture is 0.3 to 5.0 mass %. In addition, the method includes the steps of forming the mixture so as to have a predetermined shape, and sintering the mixture at a temperature of 1000 to 1150° C. to form the preform.

According to the above-mentioned method, the average of the lengths of the short fibers is set to a smaller value in order to restrain formation of a larger non-reinforced region in a compounded portion. In order to restrain deformation of the preform due to the shorter fibers during the sintering process, the amount of the binder is balanced with the sintering temperature. In consequence, the strength of the preform may be well maintained while the deformation of the preform may be prevented.

In the above-mentioned method, it is preferable that whiskers are added to the mixture in the step of mixing. If so, the whiskers as the skeleton of the preform improve the strength of the preform. Further, the ceramic particles may be better dispersed.

In the above-mentioned method, it is also preferable that the ceramic particles include particles having a first average diameter and particles having a second average diameter, which is smaller than the first average diameter. In that case, the particles having the second average diameter may be effectively interposed between the short fibers and the particles having the first average diameter so that the degree of sintering of the preform may be improved as a whole.

In the above-mentioned method, it is also preferable that the average of diameters (thickness) of the short fibers is 3 to 5 $\mu$m. If so, the strength of the preform may be better maintained while the deformation of the preform may be more effectively prevented.

In the above-mentioned method, it is also preferable that the short fibers are composed of alumina. In that case, the strength of the preform may be more effectively improved.

In the above-mentioned method, it is also preferable that the binder material is composed of alumina sol. In that case, the strength of the preform may be much more effectively improved.

In the above-mentioned method, it is also preferable that the particles having the first average diameter are composed of silicon carbide while the particles having the second average diameter are composed of titanium oxide. If so, the wear resistance and strength of the preform may be more effectively improved.

In the above-mentioned method, it is also preferable that the volumetric percentage of the whiskers in the mixture is 1 to 4%. In that case, the strength of the preform may be better improved. Further, the ceramic particles may be much better dispersed.

BRIEF DESCRIPTION OF THE DRAWINGS

The present invention will become more apparent from the following description with reference to the accompanying drawings, and in which.

DETAILED DESCRIPTION OF THE PREFERRED EMBODIMENTS

Hereinafter, embodiments of the present invention will be described in detail, with reference to the accompanying drawings.

Preform and Manufacturing Method Thereof

Figure 1:
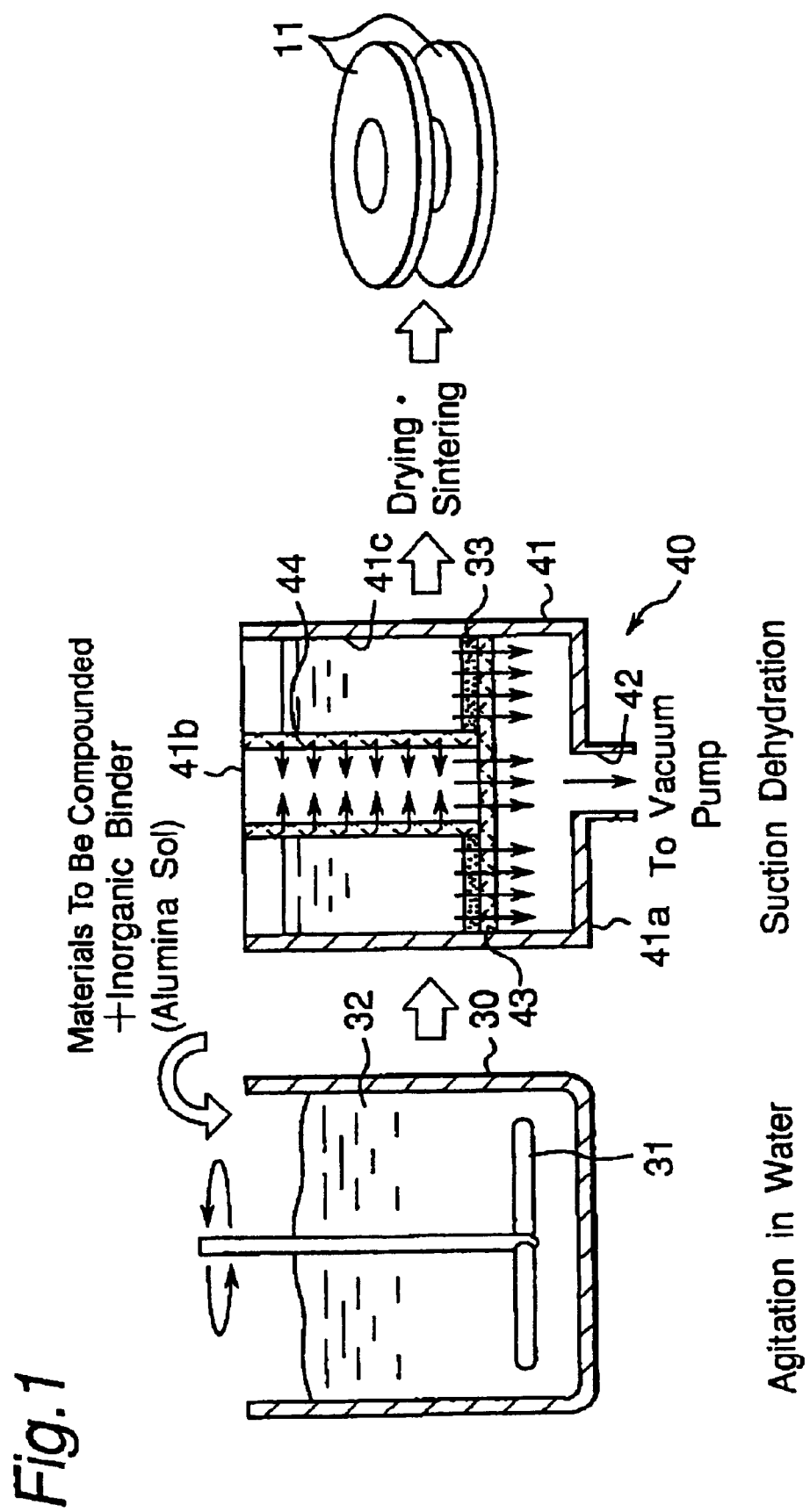
FIG. 1 is a schematic view showing a method of manufacturing a preform for compounding use, according to an embodiment of the present invention.

FIG. 1 shows a method of manufacturing a preform for compounding use, which is given an example of the embodiments according to the present invention.

As shown in FIG. 1, when a preform for compounding use 11 (for short, referred to "preform 11" hereinafter) is manufactured, at first, into a container 30, there are put materials to be compounded (i.e. materials for compounding use) such as alumina short fibers and aluminum borate whiskers, SiC, particles of $TiO_2$ and $CaCO_3$, a burnable powder, and a solvent such as water or the like. Then the materials in the container 30 are agitated and uniformly mixed together by an agitating wing 31 to prepare slurry 32. On that occasion, it is preferable that alumina sol or the like as an inorganic binder is added to the slurry by 0.3 to 5.0 mass % for the total mass.

Next, through a filter 40, the slurry 32 is sucked and dehydrated using a vacuum pump (not shown) so that the liquid components such as water or the like are removed from the slurry 32 while remaining a filter cake in the filter 40 Then the filter cake is dried up and sintered to form a preform. The filter 40 is provided with a vessel 41 having a cup shape, a suction port 42 and a filtration member 43 having a disk shape (referred to "disk filtration member 43" hereinafter). Hereupon, the suction port 42 is integrated with a bottom portion 41a of the vessel 41. The disk filtration member 43, which is made of porous material, is disposed near the central portion in the vessel 41 in view of the vertical direction while spreading in the horizontal direction. Further, the filter 40 is provided with a cylindrical filtration member 44 made of a porous material. The outer diameter of the cylindrical filtration member 44 is smaller than the inner diameter of the vessel 41. The cylindrical filtration member 44 is disposed so as to have an axis identical to that of the vessel 41 while extending from the disk filtration member 43 till an opening portion 41b of the vessel 41, which is located at the side opposite to the suction port 42. Thus the slurry 32 is put into the space between the inner peripheral surface 41c of the vessel 41 and the cylindrical filtration member 44. Then the negative suction pressure of the vacuum pump is applied to the suction port 42. In consequence, the slurry 32 can be filtrated by the disk filtration member 43 and the cylindrical filtration member 44 so that the liquid components such as water or the like in the slurry 32 can be removed.

By filtrating the slurry 32 to remove the liquid components, there is obtained a filer cake 33 having a ring shape, namely a disk shape whose center portion is lacked, as shown in FIG. 1. Thus, after the filter cake 33 has been dried up at the temperature of 100° C., it is sintered at the temperature 1000 to 1150° C. for one hour. In consequence, a preform 11 with higher strength is formed.

The sintering process is divisionally performed by two stages. At the first stage, the sintering temperature is set to a temperature which can burn off the burnable powder so that the burnable powder is completely burnt off from the filter cake 33. At the next stage, the sintering temperature is further raised so that the material to be compounded including the aluminum borate whiskers and $TiO_2$ particles or the inorganic binder, which are remaining in the filter cake 33, are sintered. In consequence, the preform 11, in which the $TiO_2$ particles are sintered in such a state that the particles are adhered to the surfaces of the aluminum borate whiskers, is obtained.

Because the portion of the above-mentioned preform 11, in which the burnable powder existed, is void, the volumetric percentage of the materials to be compounded for the total volume of the preform 11 has become smaller corresponding to the volume of the burnable powder. Accordingly, by changing the amount of the burnable powder to be used, the volumetric percentage of the material to be compounded may be adjusted or decreased. In addition, because the $TiO_2$ particles are combined to one another through the aluminum borate whiskers which are uniformly dispersed, the combination of the $TiO_2$ particles is stronger in comparison with the case that the $TiO_2$ particles are directly combined to one another. Therefore, the strength of the preform 11 may be well maintained even though the volumetric percentage of the materials to be compounded is smaller. As the result, the volumetric percentage of the materials to be compounded can be lowered without lowering the strength of the preform 11. Thus the molten metal can easily impregnate into the preform 11 so that it may be prevented that the preform 11 cracks.

Further, in the case that the inorganic binder is mixed, the binder is sintered together with the $TiO_2$ particles and the aluminum borate whiskers during the sintering process of the filter cake 33. Therefore, the $TiO_2$ particles may be combined to one another more strongly, and further the $TiO_2$ particles may be combined with the aluminum borate whiskers much strongly. In consequence, the strength of the preform 11 may be well maintained even if the sintering temperature is lower. If the sintering temperature is equal to that in the case that the inorganic binder is not mixed, the strength of the preform 11 may be further improved.

Hereupon, the alumina fibers, which constitute a main skeleton of the preform 11, have diameters of 3.0 to 5.0 $\mu$m, an average of lengths of 100 to 200 $\mu$m, and a volumetric percentage of 1 to 7%. If the average of the lengths of the alumina short fibers is smaller, there is such a tendency that the time required for sucking the slurry extremely increases while the amount of deformation of the preform 11 after the sintering process increases. On the contrary, if the average of lengths is longer, each of the components in the slurry is non-uniformly dispersed so that larger non-reinforced regions may be formed Accordingly, the average of the lengths is preferably set in the range of 100 to 200 $\mu$m.

The aluminum borate whiskers constitute a skeleton of the preform 11. The volumetric percentage of the aluminum borate whiskers in relation to the $TiO_2$ particles is set to 1 to 4%, preferably set to 1 to 3%. If the volumetric percentage of the aluminum borate whiskers in relation to the $TiO_2$ particles is smaller than 1%, the molten metal insufficiently impregnates, while the strength of the preform 11 becomes similar to that in the case that only the $TiO_2$ particles are used so that the strength can not be improved. On the other hand, if the volumetric percentage is larger than 4%, the gas permeability may become better. However, in this case, the rigidity of the preform 11 is lowered, because the whiskers become the main constituents in relation to the ceramic particles in the preform 11. In consequence, the preform 11 may easily contract and crack when the preform 11 is impregnated with the molten metal so as to form the compounded portion. Further, the manufacturing cost of the preform 11 may be increased due to the expensive aluminum borate whiskers while the void content of the preform 11 is lowered. In consequence, the volumetric percentage of the aluminum borate whiskers is preferably set to 1 to 4%.

Because the average of the diameters of the SiC particles, which are ones of the ceramic particles, is larger than that of the $TiO_2$ particles, the SiC particles improve the wear resistance. Although the average of the diameters of the $TiO_2$ particles is smaller than that of the SiC particles, the $TiO_2$ particles also improve the wear resistance while being fixed on the alumina fibers. As the result, the $TiO_2$ particles can be effectively interposed between the alumina fibers and the SiC particles so that the sintering performance may be improved as a whole.

The amount of the $TiO_2$ particles to be used is set to 10 to 50% in relation to the volumetric percentage of the ceramic particles. The average of the diameters of the $TiO_2$ particles is set to 0.1 to 10 $\mu$m, preferably to 0.3 to 1.0 $\mu$m. If the average is smaller than 0.1 $\mu$m, the formability of the preform 11 may be deteriorated. On the other hand, if the average is larger than 10 $\mu$m, it may become hard to sinter the filter cake because the surface energy of the particles is lowered.

The average of the diameters of the $CaCO_3$ particles is also set to 0.1 to 10 $\mu$m. The $CaCO_3$, particles react with the $TiO_2$ particles to be fixed on the alumina fibers.

It is preferable that the aluminum borate whiskers have diameters of 0.5 to 1.0 $\mu$m and a average of lengths of 10 to 30 $\mu$m. If shorter whiskers with smaller diameters are used, the filling density of the whiskers may become too large so that the gas pores of the preform 11 become smaller. In consequence, it may become hard that the molten metal impregnate into the preform 11 when the compounding process is preformed. On the contrary, if longer whiskers with larger diameters are used, it may become hard that the materials are uniformly mixed together when the slurry is prepared. It may be preferable that the volumetric percentage of the whickers in relation to the ceramic particles is set to 1 to 3%.

Figure 2:
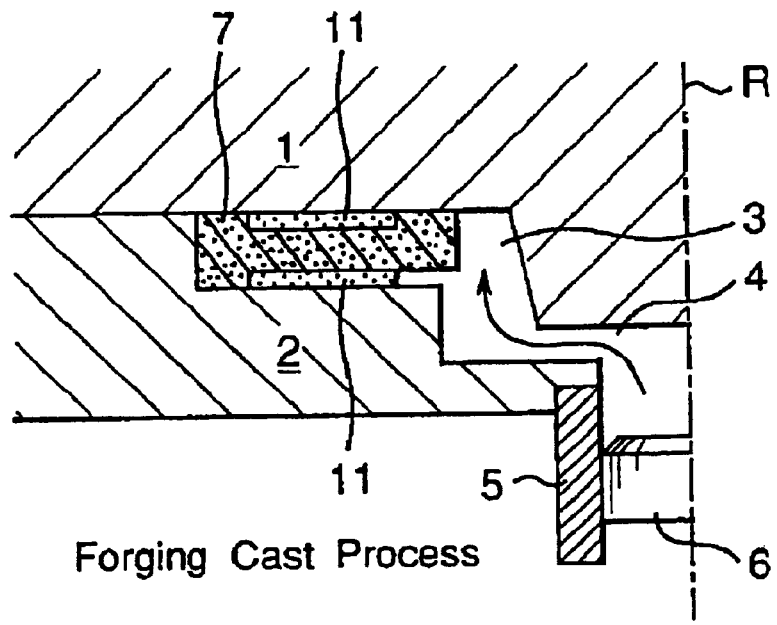
FIG. 2 is a partially sectional view of a casting die for producing a ventilated brake disk rotor, in which a casting core and a porous member for compounding use are disposed.
Figure 3:
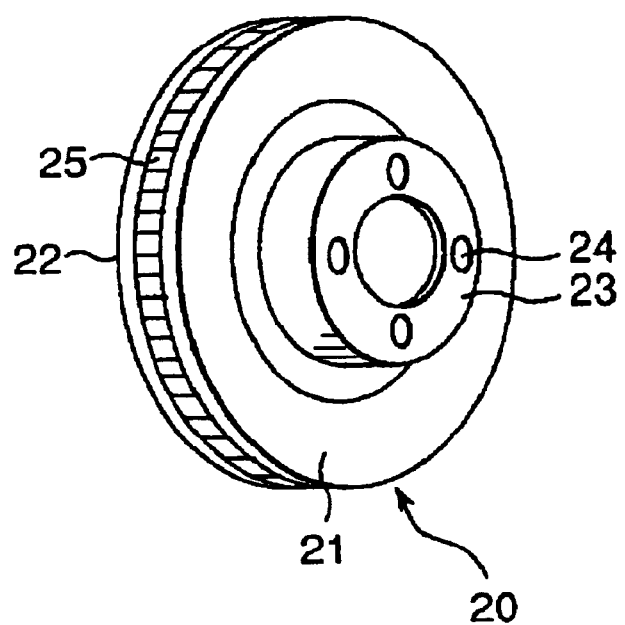
FIG. 3 is a perspective view of a product which has been formed using the casting die according to the present embodiment and performed a finishing treatment.

Hereupon, the ceramic particles may be composed of aluminum oxide ($Al_2O_3$) or the like. The whiskers do not mean short fibers, but crystals grown to needle-like forms. The whiskers may be intrinsic whiskers, which are formed by making metals or the like grow and crystallize naturally. Meanwhile, the whiskers may be non-intrinsic whiskers, which are formed by making metals of liquid phase or gas phase grow or by making metals grow as the results of chemical reactions. Instead of the aluminum borate whiskers, there may be used other whiskers, for example SiC whiskers or the like. ps Casting Process Using the Preform FIG. 2 is a partially sectional view of a casting die for producing a ventilated brake disk rotor, in which porous members as the preforms for compounding use according to the embodiment of the present invention, are disposed. FIG. 3 is a perspective view of a product which has been formed using the casting die according to the present embodiment and performed a finishing treatment. Hereupon, the casting die shown in FIG. 2 is used in a high pressure casting process for producing a ventilated brake disk rotor made of aluminum alloy.

The casting die is composed of a pair of partial dies, namely an upper die 1 and a lower die 2. When the upper die 1 and the lower die 2 are closed to each other, a cavity 3 is formed between the two dies. The lower die 2 is provided with a sprue 4 through which the molten metal is filled into the cavity 3, a sleeve 5 which forms a passage for the molten metal connected to the sprue 4, and a movable plunger 6 for pressing and supplying the molten metal to the sprue 4, the plunger being able to vertically slide along the inner wall surface of the sleeve 5. The molten metal is pressed and moved upward by the movable plunger 6, and then introduced into the cavity 3 through the sprue 4 while maintaining its high pressure.

In the cavity 3, there is disposed a sand core 7 for forming a hole through which cooling air flows (referred to "cooling air hole" hereinafter), at the solid portion of the rotor. The sand core 7, which is formed in a disk shape, is disposed in the cavity 3 in such a manner that its central axis line coincides with a line R (i.e. central line of the casting die), and further the central axis line of the rotating shaft of the rotor and the central axis line of the sleeve 5 coincide with the line R. In addition, the sand core 7 has a plurality of slits for forming ventilation holes between its outer peripheral surface and its inner peripheral surface. The slits are disposed along the peripheral direction of the sand core 7, with a radial shape having a regular interval around the line R.

Each of the upper die 1 and the lower die 2 is provided with a preform 11 on the inner surface thereof. The preform 11, which is composed of porous ceramic or the like, has been previously formed so as to be compounded with the molten metal. The preform 11 is to be partially compounded with the sliding surface of the brake disk rotor.

FIG. 3 shows a ventilated brake disk rotor 20 which has been produced using the above-mentioned casting die by means of a high pressure casting process The preforms 11 are compounded with the sliding surfaces 21 and 22 of the brake disk rotor 20. Hereupon, the surfaces of the brake disk rotor 20 have been shaved by about 1 mm thickness by means of finish processing. In addition, a plurality of cooling air holes 25 arranged with radial shapes are formed between the sliding surfaces 21 and 22 of the brake disk rotor 20 (solid portion of the rotor). Moreover, the brake disk rotor 20 is provided with a hub-mounting portion 23 of a convex shape protruding from the sliding surface 21. In the hub-mounting portion 23, four holes 24 for mounting screws are formed by drill processing.

The sliding surface 21 and 22 of the brake disk rotor 20 are formed by the following process. That is, at first, the preforms 11 composed of porous forms including ceramic particles and fibers are disposed in the casting die. Next, the preforms 11 are impregnated with molten aluminum alloy. Then, the molten aluminum alloy is solidified so that the sliding surfaces are formed.

Test and Evaluation

Figure 4:
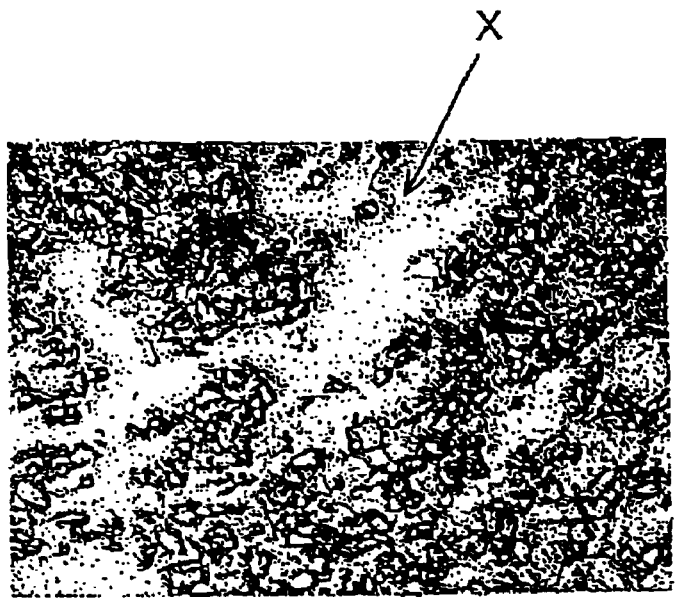
FIG. 4 is a photographic view showing a structure in a compounded portion of a brake disk rotor, which has been compounded according to a conventional technique.
Figure 5:
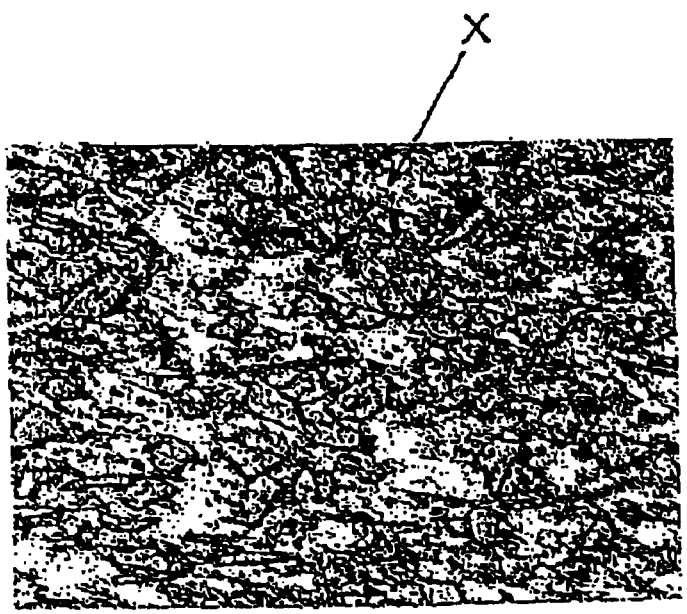
FIG. 5 is a photographic view showing a structure in a compounded portion of a brake disk rotor, which has been compounded according to the embodiment of the present invention.

FIG. 4 shows the structure (i.e. fabric) of a compounded portion of a brake disk rotor, which was compounded in accordance with a conventional technique. FIG. 5 shows the structure of a compounded portion of a brake disk rotor, which was compounded in accordance with the embodiment of the present invention.

According to the conventional technique, after an ingot in which SiC particles have been previously dispersed is melted, the brake disk rotor is produced by casting the ingot. In consequence, the SiC particles are non-uniformly dispersed in the compounded portion. As the result, as apparent from FIG. 4, there is formed a non-reinforced region X having a size of 200 to 400 $\mu$m where any SiC particles do not exist. On the other hand, according to the embodiment of the present invention, the size of the non-reinforced region X is reduced to 100 to 200 $\mu$m, as apparent from FIG. 5. The non-reinforced region X is a principal source of abration formed on the sliding surface of the brake disk rotor against the brake pad when a fade test described below is performed. Due to the abration, the sliding surface against the brake pad becomes rough so that the temperature of the brake disk rotor is raised to a high temperature.

Figure 6:
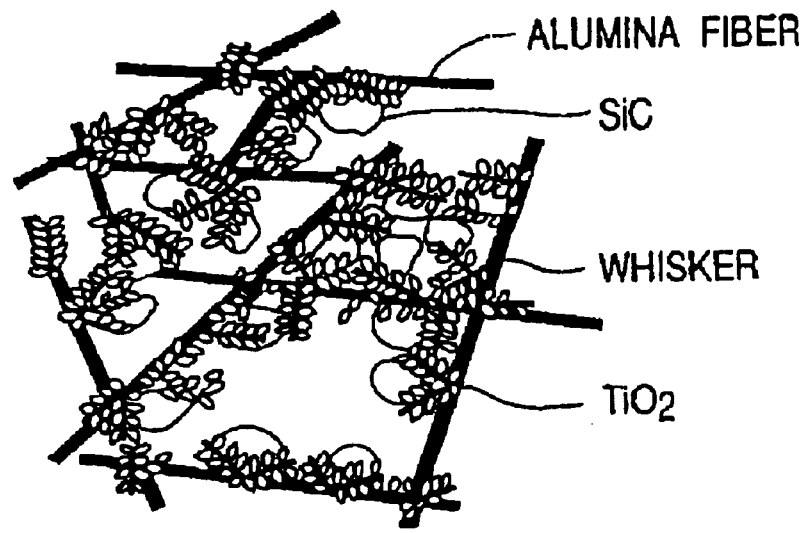
FIG. 6 is a schematic view of a structure of the compounded portion in the case that the lengths of the alumina fibers are longer.
Figure 7:
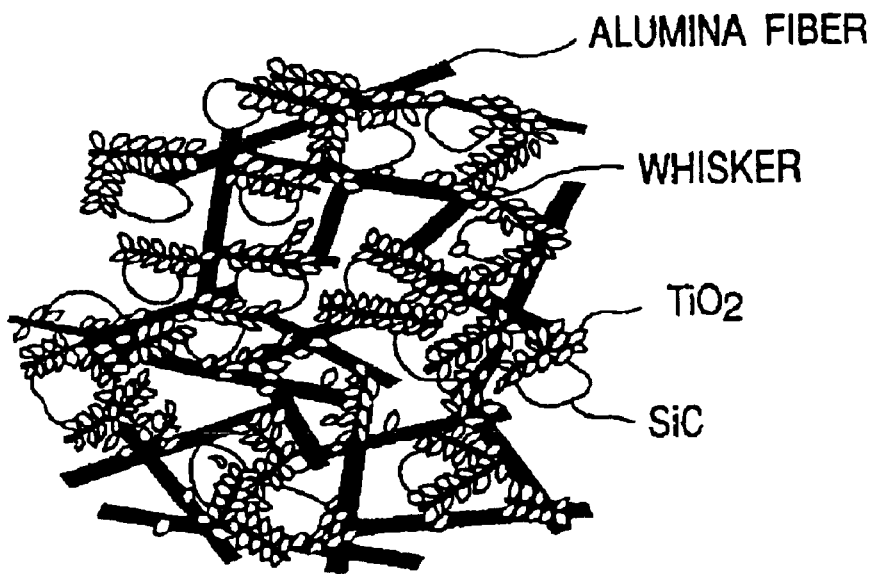
FIG. 7 is a schematic view of a structure of the compounded portion in the case that the lengths of the alumina fibers are shorter.

As shown in FIG. 6, if the lengths of the alumina fibers are longer, the materials to be compounded are ununiformly dispersed so that the non-reinforced region X in the compounded portion may become larger. On the other hand, as shown in FIG. 7, if the lengths of the alumina fibers are shorter, the materials to be compounded are uniformly dispersed so that the non-reinforced region X may become smaller. However, if the lengths of the alumina fibers are too short, there occurs such a disadvantage that the alumina fibers cannot sufficiently accomplish their role to constitute the skeleton of the preform.

Table 1 shows the sucking time (i.e. time required for the suction process), the volumetric percentage after the suction process and the volumetric percentage after the sintering process, regarding to preforms which have been manufactured using four kinds of alumina fibers (I–IV), wherein the average lengths of the four kinds of alumina fibers are different from one another. According to Table 1, in the case that the alumina fibers I are used, the sucking time is extremely long while the volumetric percentage after the suction process is 34%. The volumetric percentage after the sintering process is lifted to 39% because of the contraction of the preform. Hereupon, the average lengths of the alumina fibers I to IV are 84.6 $\mu$m, 115.4 $\mu$m, 146.1 $\mu$m and 243.6 $\mu$m, respectively.

TABLE 1

| Formability | Lengths of Fibers ($\mu$m) | | | |
| --- | --- | --- | --- | --- |
| | I (84.6) | II (115.4) | III (146.1) | IV (243.6) |
| Sucking Time (sec) | 128 | 38 | 25 | 18 |
| Volumetric Percentage after Suction (%) | 34 | 29 | 27 | 27.5 |
| Volumetric Percentage after Sintering (%) | 39 | 30 | 29 | 28 |

If the volumetric percentage of the materials to be compounded is lifted to 40%, it may become extremely difficult to compound the materials. In this case, the volumetric percentage cannot be lowered, even if the suction force is lowered. On the other hand, in the case that the alumina fibers II or III are used, the contraction of the preform after sintering process is smaller so that the volumetric percentage may be maintained at 30%, although the sucking time is increased a little.

Figure 8:
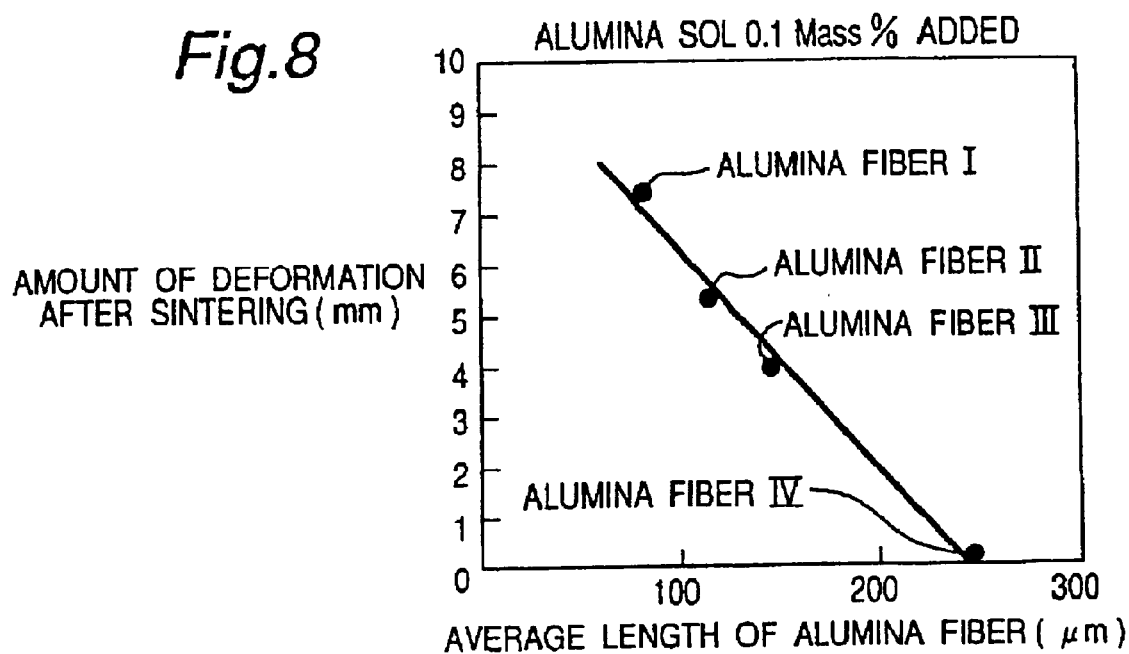
FIG. 8 is a graph showing a relation between the lengths of alumina fibers and the amounts of deformation of the preforms after the sintering process.
Figure 9:
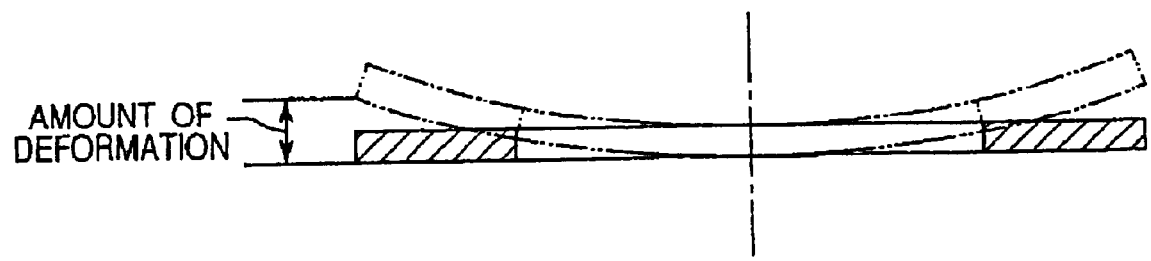
FIG. 9 is a view showing the deformation of the preform due to its warp.

FIG. 8 shows the relation between the average lengths of the alumina fibers and the amounts of deformation due to strain, of the preforms after the sintering process. In each of those preforms, alumina sol is added thereto by 0.1 mass % for the total mass of the materials to be compounded. FIG. 9 shows the deformation of the preform due to its warp. Hereupon, the strain means the warp shown in FIG. 9.

According to FIG. 8, the preform using the alumina fibers IV has little strain. Further, there is such a tendency that the shorter the average length becomes, the larger the strain (i.e. deformation) becomes.

As described above, the shorter the average length of the fibers becomes, the worse the formability during the suction process becomes, that is the larger the deformation due to the strain or the increase of the volumetric percentage due to the contraction during the sintering process becomes. In particular, regarding to the preform using the alumina fibers IV, the above-mentioned tendency is remarkable. On the other hand, regarding to the preform using the alumina fibers II or III, the formability during the suction process is equal to that of the conventional preform using the alumina fibers IV while the volumetric percentage after the sintering process has not be changed, although the deformation due to the strain exists.

If the sintering temperature is lowered, the strain during the sintering process may be prevented. However, if so, the preform cannot have sufficient strength. Meanwhile, in the case of the preform using the alumina fibers II or III, whose strain during the sintering process comes into question, if the alumina sol as inorganic binder is merely increased, the degree of sintering is raised so that the deformation due to the strain may become larger. So, the alumina sol is increased while the sintering temperature is suitably adjusted.

Figure 10:
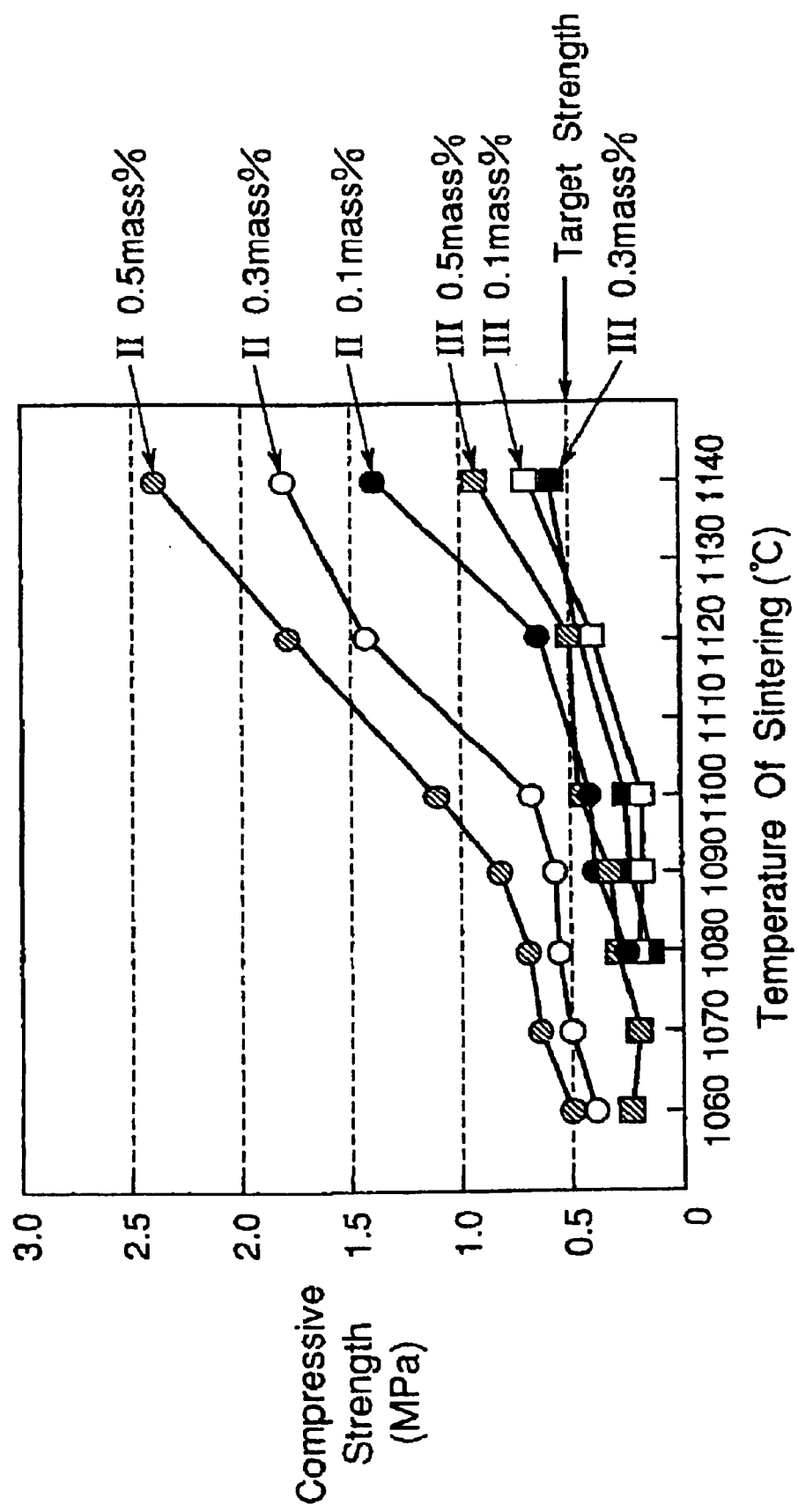
FIG. 10 is a graph showing the relation between the sintering temperature and the compressive strength of each of the preforms, in the case that the alumina sol is added to the alumina fibers II, III by 0.1 mass %, 0.3 mass % or 0.5 mass % for the total mass of the materials to be compounded.
Figure 11:
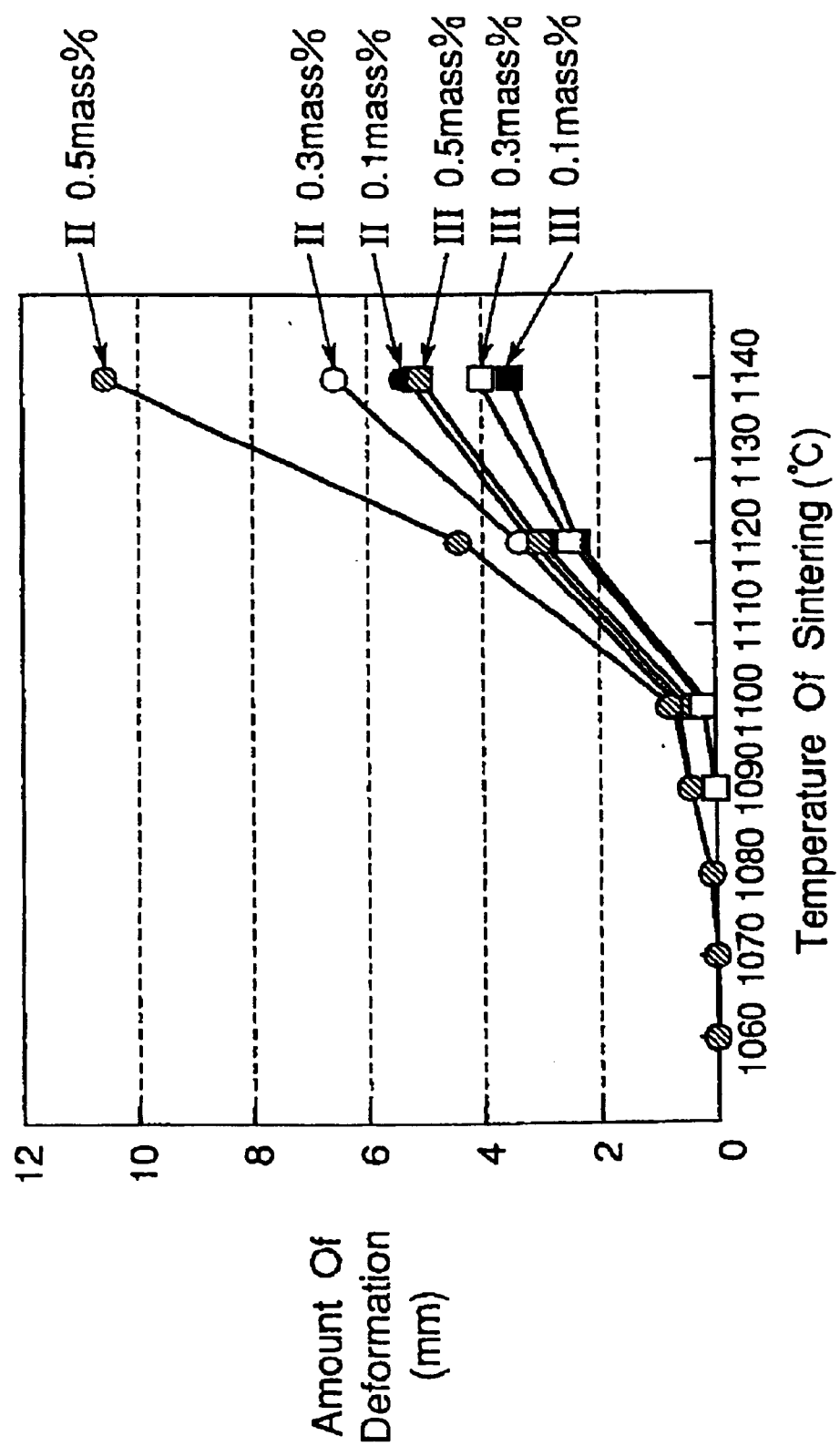
FIG. 11 is a graph showing the relation between the sintering temperature and the amount deformation of each of the preforms, in the case that the alumina sol is added to the alumina fibers II and III by 0.1 mass %, 0.3 mass % or 0.5 mass % for the total mass of the materials to be compounded.

FIG. 10 shows the relation between the sintering temperature and the compressive strength of each of the preforms, in the case that the alumina fibers II or III are used while the alumina sol is added by 0.1 mass %, 0.3 mass % or 0.5 mass % for the total mass of the materials to be compounded. Meanwhile, FIG. 11 shows the relation between the sintering temperature and the amount of deformation.

The compressive strength in FIG. 10 means surface pressure corresponding to he load at the time point that the preform is budded when a compressive load is applied to the preform. The compressive strength of the alumina fibers IV which have been conventionally used, is about 5 MPa. If the compressive strength is used as a target strength, the alumina fibers II may have sufficient strength when the alumina sol of 0.3% mass is added thereto while the sintering temperature is set to 1080° C. Further, according to FIG. 11, it may be understood that the strain (i.e. deformation) is restrained if the sintering temperature is 1080° C. or below.

As to the case that the alumina fibers III are used, even if alumina sol of 0.5 mass % is added, sufficient strength cannot be achieved in the case that the sintering temperature is lower than 1120° C. Further, according to FIG. 11, it may be understood that the strain (i.e. deformation) occurs at the temperature of 1120° C. Hereupon, when the sintering temperature is higher than 1100° C., there is such a tendency that the strength of the preform increases steeply. The reason is because $\gamma\ Al_2O_3$ contained in the alumina sol is converted to $\alpha\ Al_2O_3$ at the temperature of 1100° C. Thus, if the sintering temperature is higher than 1100° C., the amount of deformation of the preform also increases.

According to the results described above, in order to make the materials to be compounded disperse uniformly while using alumina fibers whose average length is shorter, it may be adequate that alumina fibers II is used, alumina Sol of 0.3 to 0.5 mass % is added, and the sintering temperature is set to about 1080° C.

Figure 12:
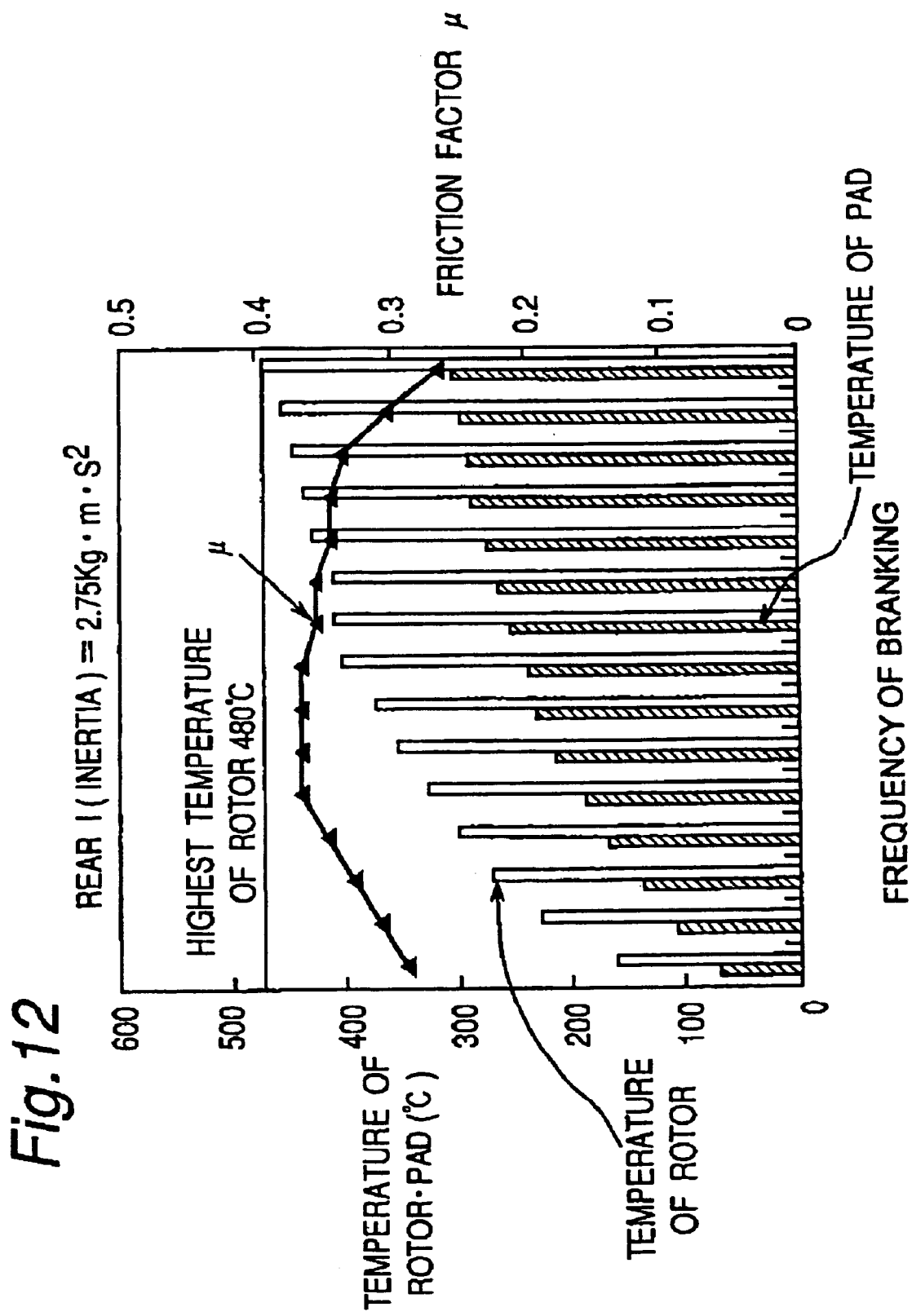
FIG. 12 is a graph showing the relation among the frequency of the braking operation, the friction factor and the temperature of the braking pad for the rear brake disk rotor during the fade test.
Figure 13:
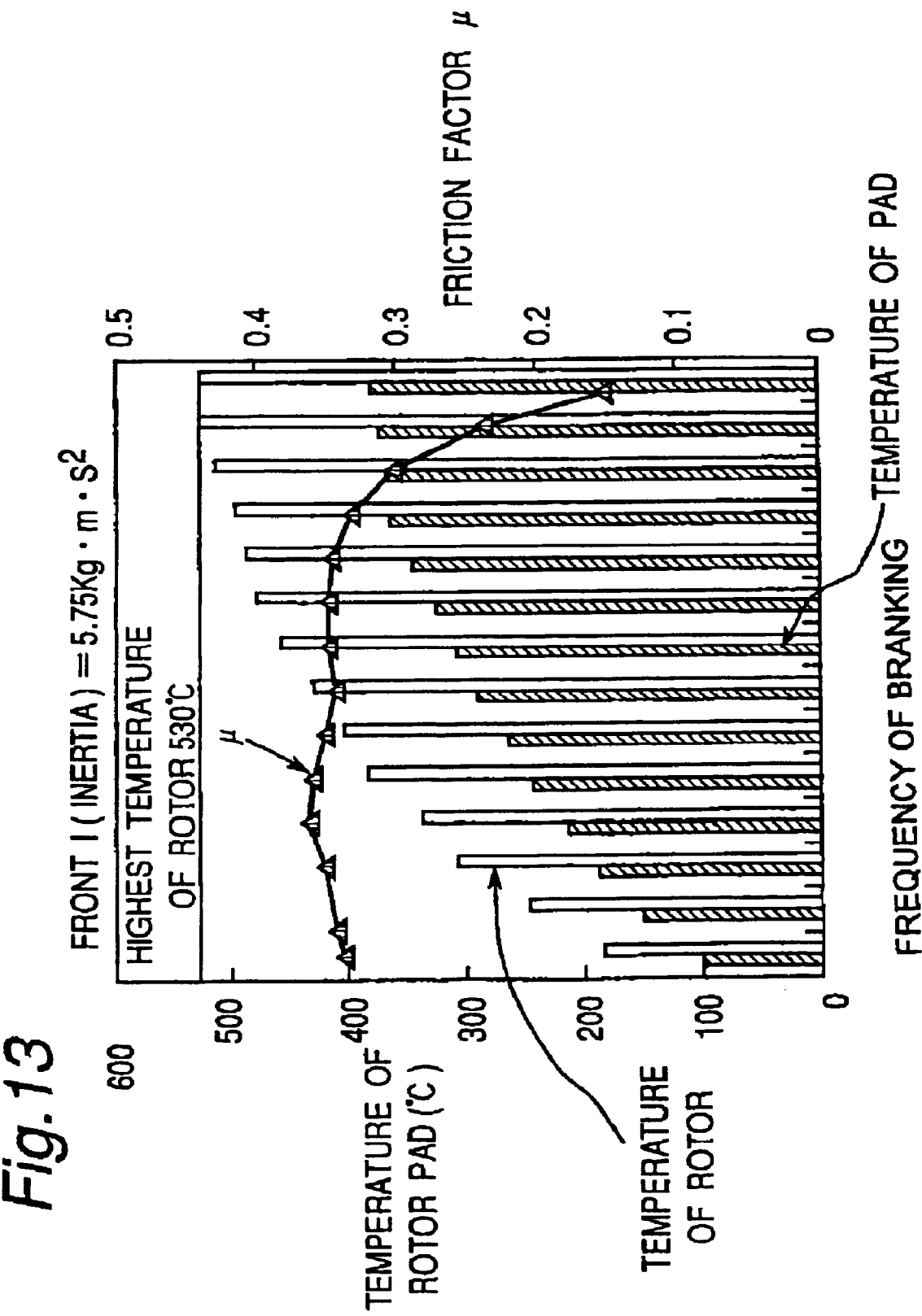
FIG. 13 is a graph showing the relation among the frequency of the braking operation, the friction factor and the temperature of the braking pad for the front brake disk rotor during the fade test.
Figure 14:
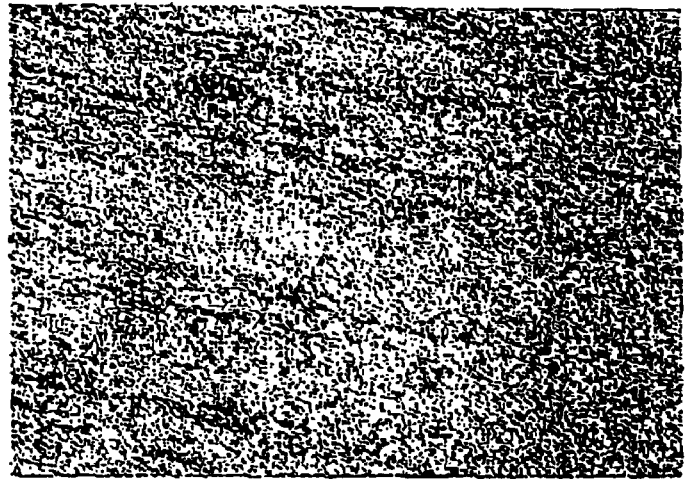
FIG. 14 is a photographic view showing the surface condition after the fade test, of the rear brake disk rotor produced according to the embodiment of the present invention.
Figure 15:
FIG. 15 is a photographic view showing the surface condition after the fade test, of the front brake disk rotor produced according to the embodiment of the present invention.

FIG. 12 shows the relation between the frequency of braking operation and the friction factor, and the relation between the frequency of the braking operation and the temperature of the rear brake disk rotor or the brake pad, during the fade test. FIG. 13 shows the relation between the frequency of braking operation and the friction factor, and the relation between the frequency of the braking operation and the temperature of the front brake disk rotor or the brake pad, during the fade test. FIG. 14 shows the surface condition of the rear brake disk rotor after the fade test, the rotor having been produced by means of the process according to the embodiment of the present invention. FIG. 15 shows the surface condition of the front brake disk rotor after the fade test, the rotor having been produced by means of the process according to the embodiment of the present invention.

As shown in FIGS. 12 and 13, during the fade test, the highest temperature of the rear brake disk rotor is about 480° C. while the highest temperature of the front brake disk rotor is about 530° C. Further, as shown in FIGS. 14 and 15, the surfaces of both of the rear and front brake disk rotors are very smooth while any abration is not found on the surfaces.

Hereupon, the fade test was performed as follows. That is, the brake disk rotor was braked by the brake pad with deceleration of 4.9 m/s² from 100 km/h to 0 km/h. This braking operation was repeated fifteen times with the interval of thirty-five seconds Table 2 comparatively shows the diameter and mass of the rear brake disk rotor made of cast iron or aluminum alloys and the temperature of the rotor during the fade test. Table 3 comparatively shows the diameter and mass of the front brake disk rotor made of cast iron or aluminum alloy, and the temperature of the rotor during the fade test.

TABLE 2

| Materials of Rotor | Size of Rotor (inch) | Mass (kg) | Higher Temp. of Faded Rotor |
|---|---|---|---|
| Cast Iron | 14 | 3.50 | 430° C. |
|  | 15 | 4.10 | 371° C. |
| Aluminum Alloy | 14 | 1.35 | 505° C. |
|  | 15 | 1.55 | 470° C. |
|  | 16 | 1.75 | 440° C. |

TABLE 3

| Materials of Rotor | Size of Rotor (inch) | Mass (kg) | Higher Temp. of Faded Rotor (I = 5.75) |
|---|---|---|---|
| Cast Iron | 15 | 6.4 | 550° C. |
| Aluminum Alloy | 15 | 2.45 | 530° C. |
|  | 16 | 2.8 | 458° C. |
|  | 17 | 3.1 |  |
|  | 18 | 3.45 |  |
|  | 18 | 3.8 |  |

I: Inertia kg · m · S²

As the rear brake disk rotors shown in Table 2, during the fade test, the highest temperature of the brake disk rotor of 14 inches made of cast iron is 430° C. Meanwhile, as apparent from FIG. 12, during the fade test, the highest temperature of the brake disk rotor made of aluminum alloy is about 480° C. According to Table 2, in the case of the brake disk rotor of 15 inches made of aluminum alloy, the highest temperature is 470° C. which is within the useful limit temperature. Accordingly, as to the rear brake disk rotor, if the rotor size is equal to or larger than 15 inches, the materials of the rotor may be converted from cast iron to aluminum alloy. The brake disk rotor of 15 inches made of aluminum alloy may be lighter by 5 kg in comparison with the brake disk rotor of 15 inches made of cast iron. In consequence, the size of the brake disk rotor made of aluminum alloy can be reduced to 15 inches, although the size of the conventional one is required to be 16 to 17 inches in accordance with the useful limit temperature.

As to the front brake disk rotors shown in Table 3, during the fade test of inertia I of 5.75 kg·m·S², the highest temperature of the brake disk rotor of 15 inches made of cast iron is 550° C. Meanwhile, as apparent from FIG. 13, during the rotor fade test, the highest temperature of the brake disk rotor made of aluminum alloy is about 530° C. According to Table 3, in the case of the brake disk rotor of 15 inches made of aluminum alloy, the highest temperature is 530° C. which is within the useful limit temperature. Accordingly, as to the front brake disk rotors, if the rotor size is equal to or larger than 15 inches, the materials of the rotor may be converted from cast iron to aluminum alloy. The brake disk rotor of 15 inches made of aluminum alloy may be lighter by 6 kg in comparison with the brake disk rotor of 15 inches made of cast iron. In consequence, the size of the brake disk rotor made of aluminum alloy can be reduced to 15 inches, although the size of the conventional one is required to be 16 to 17 inches in accordance with the useful limit temperature.

EXAMPLE

Hereinafter, an example of the process for compounding the a preform according to the present invention will be described. In this example, a forging cast process is utilized.

In the process, the molten metal is composed of aluminum alloy provided by the JIS standard as AC4C. The molten metal having the temperature of 780° C. is pressed up to about 30.4 MPa, and then filled into the casting die with the filling rate of 40 mm/sec. Hereupon, the temperature of the preform is 700° C. The preform has been manufactured using alumina fibers whose average length is 115.4 μm (i.e. alumina fibers II described above).

The sand core used in this example is a resin coated shell core having the following properties.

| | |
|---|---|
| Ratio of resin: | 2.1–2.3 mass % |
| Deflection force: | about 6.5 MPa |
| Grain size (AFS): | 65–75 |
| Average particle diameter: | 0.15 mm |

The sand core is produced by sintering the materials at the temperature of 300 to 320° C., blowing the same for 3 seconds, and curing the same for 40 seconds.

According to the example, the materials to be compounded are uniformly dispersed so that the size of the non-reinforced region may be reduced. In addition, because the materials can be compounded with a lower pressure of 30.4 MPa, it may be possible to make a brake disk rotor of a large size.

As described above, the embodiment or example of the present invention relates to the method of producing the ventilated brake disk rotor, which uses the high pressure casting process. However, applications of the casting of aluminum alloy produced in accordance with the present invention may not be limited to the above-mentioned brake disk rotor. Thus, the casting of aluminum alloy may be applied to many other parts which are required to have good wear resistance and to be light Meanwhile, the present invention is not limited to the method of producing the casting of aluminum alloy, but may be applied to other methods of producing castings of light metals such as magnesium alloy or the like.

Although the present invention is described above taking specific embodiments as examples, it will be understood by those skilled in the art that the present invention is not limited to these embodiments, but covers all modifications which are within the scope and spirit of the present invention as defined by the appended claims.

What is claimed is:

1. A method of manufacturing a preform for compounding use which is to be impregnated with a molten metal to be compounded with a matrix material, said method comprising the steps of:

mixing short fibers, ceramic particles, whiskers and a binder material together to make a mixture, an average of lengths of said short fibers being at least 100 μtm and smaller than 200 μm, an average of diameters of said short fibers being 3 to 5 μm, a volumetric percentage of said short fibers being 1 to 7%, said ceramic particles including silicon carbide particles having a first average diameter and titanium oxide particles having a second average diameter which is smaller than the first average diameter, a volumetric percentage of said whiskers in said mixture being 1 to 4% in relation to said titanium oxide particles, and a content of said binder material in said mixture being 0.3 to 5.0 mass % for the total mass;

forming said mixture so as to have a predetermined shape; and sintering said mixture at a temperature of 1000 to 1150° C. to form said preform.

2. The method according to claim 1, wherein said short fibers are composed of alumina.

3. The method according to claim 1, wherein said binder material is composed of alumina sol.

4. The method according to claim 1, wherein an amount of said titanium oxide particles is 10 to 50% in relation to the volumetric percentage of said ceramic particles.

5. The method according to claim 1, wherein said whiskers are composed of aluminum borate, the volumetric percentage of said whiskers being 1 to 3% in relation to said titanium oxide particles.

6. The method according to claim 1, wherein said whiskers are composed of aluminum borate, diameters of said whiskers being 0.5 to 1.0 μm, and an average of lengths of said whiskers being 10 to 30 μm.

7. The method according to claim 1, wherein $CaCO_3$ particles are added to said mixture in said step of mixing, an average of diameters of said $CaCO_3$ particles being 0.1 to 10 μm.

* * * * *